United States Patent [19]
Matt

[11] Patent Number: 5,307,708
[45] Date of Patent: May 3, 1994

[54] CAMSHAFT FOR CONTROLLING VALVES IN INTERNAL COMBUSTION ENGINES

[75] Inventor: Lukas Matt, Förstentum Liechenstein, Fed. Rep. of Germany

[73] Assignee: Etablissement Supervis, Fürstentum, Liechtenstein

[21] Appl. No.: 907,253

[22] Filed: Jul. 1, 1992

[30] Foreign Application Priority Data

Jul. 3, 1991 [DE] Fed. Rep. of Germany ....... 4121951

[51] Int. Cl.$^5$ .......................... F16H 53/02; F01L 1/46
[52] U.S. Cl. ..................................... 74/567; 403/282; 123/90.6; 29/888.1
[58] Field of Search .......... 74/567; 123/90.6; 403/282, 285, 345; 29/888.1, 525

[56] References Cited

U.S. PATENT DOCUMENTS

| | | | |
|---|---|---|---|
| 4,265,388 | 5/1981 | Takahashi et al. | 123/90.6 X |
| 4,597,365 | 7/1986 | Madaffer | 123/90.6 |
| 4,774,852 | 10/1988 | Matt | 74/567 |
| 4,781,075 | 11/1988 | Yamaji et al. | 74/567 |
| 4,781,076 | 11/1988 | Hartnett et al. | 74/567 |
| 4,798,178 | 1/1989 | Grevlich et al. | 123/90.6 |
| 4,903,543 | 2/1990 | Matt | 74/567 |
| 4,922,785 | 5/1990 | Arnold et al. | 74/567 |
| 5,033,903 | 7/1991 | Olsson et al. | 403/282 |
| 5,158,390 | 10/1992 | Ito et al. | 403/282 |

FOREIGN PATENT DOCUMENTS

| | | | |
|---|---|---|---|
| 0340128 | 11/1989 | European Pat. Off. | |
| 55-1924 | 1/1980 | Japan | 29/525 |
| 62-107925 | 5/1987 | Japan | 29/525 |

Primary Examiner—Richard M. Lorence
Attorney, Agent, or Firm—Anderson Kill Olick & Oshinsky

[57] ABSTRACT

A camshaft for controlling the valves in internal combustion engines, including a shaft 1 and at least one forged cam slid- or pushed-upon the shaft and solidly connected with it, with the cam having an opening for receiving the shaft. The shaft having a segment with an increased diameter at the location of the cam compared to the other regions or segments of the shaft, this region is manufactured rollers or rolls, wherein circumferential beads or webs are generated by material displacement in the circumferential direction of the shaft, the opening in the cam for receiving the shaft is widened in a funnel-shaped manner at least on one side and at least over a portion of its axial length, and the dimension of the mouth aperture of the funnel-shaped widening corresponds approximately to the radial height of the beads or webs.

5 Claims, 1 Drawing Sheet

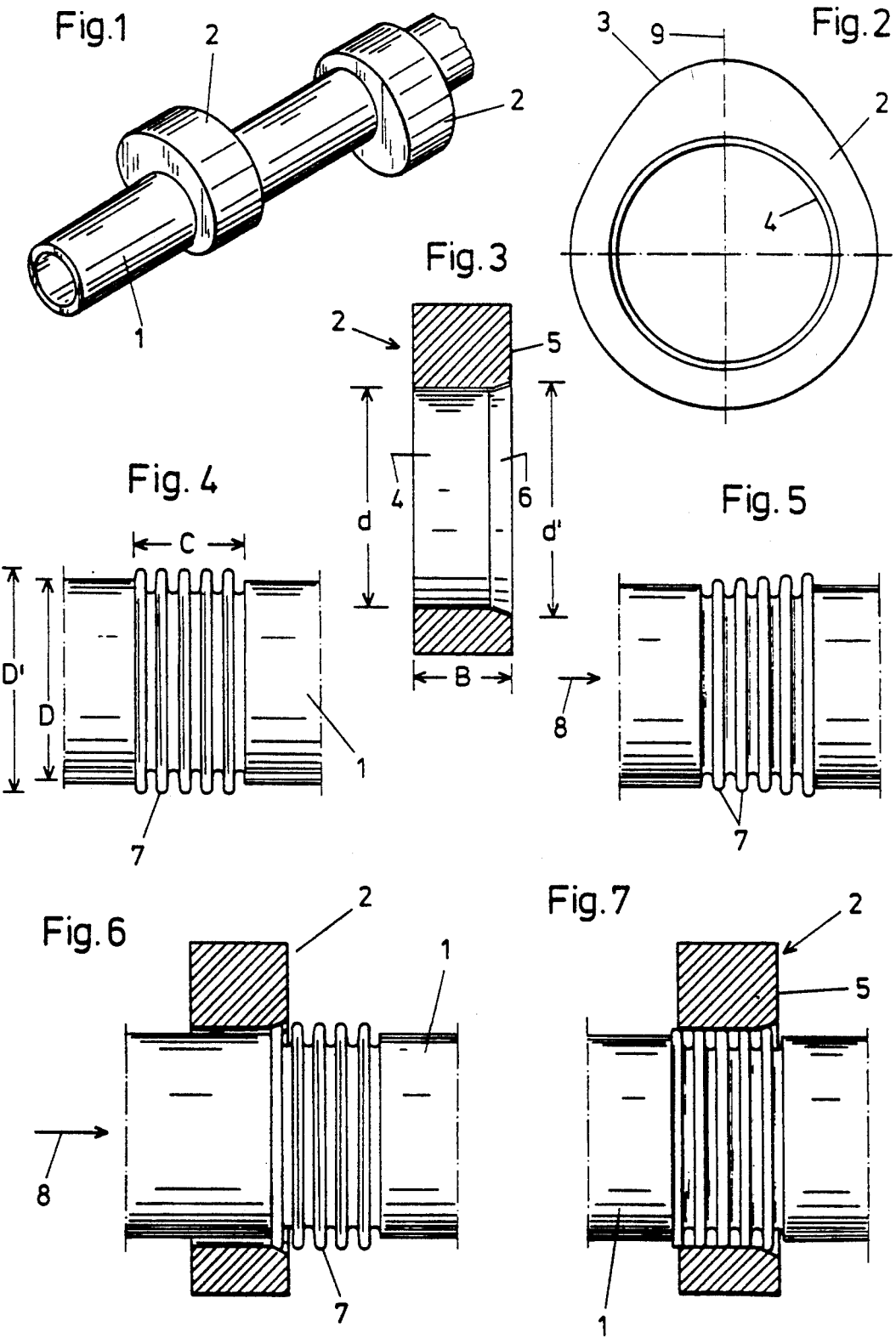

CAMSHAFT FOR CONTROLLING VALVES IN INTERNAL COMBUSTION ENGINES

BACKGROUND OF THE INVENTION

The invention deals with a camshaft for controlling valves in internal combustion engines. The cam shaft having at least one cam pushed upon the shaft and solidly connected thereto. The shaft having regions for the cams that have a larger diameter than the other regions of the shaft, and are provided with webs and beads formed by material displacement.

A camshaft of this type is described and shown in DE-OS 37 17 190, and a method for manufacturing such a camshaft is explained therein. The cams, which in this known design are pushed onto the shafts, are manufactured by sintering. The blank pressed from this sintered material is shaped so that the penetration into which the shaft must fit comprises radially projecting protrusions which extend across the entire axial length of the cam or the mentioned penetration. Herein several of such projections are provided so as to be uniformly distributed across the circumference of the penetration. As a consequence of the ledge or spring-like projections, the penetration is non-uniform across its circumference, meaning this penetration has several points at which an infinite quantity of tangents can be applied, at least theoretically.

The diameter of this penetration in the cam corresponds essentially to the diameter of the widened regions of the shaft, so that if the mentioned inner projections are non-existent, the cam could be slid upon the widened regions of the shaft without exerting any particular force. These ledge- or spring-like projections molded into the penetration, or their front end edge and end face viewed in sliding-on direction, have the task in this known design to act, as it were, as levers, and to serve to produce the groove when sliding the cam upon the shaft, which groove is required for the positive lock between the shaft and the cam. The slid-on cam is retained by pure positive lock upon the shaft in this previously known design. This known design can be remarkably rationally manufactured for camshafts with sintered cams.

Numerous motors exist, for which camshafts with forged steel cams are preferred and prescribed. Such steel cams are forged and subsequently tempered, in order to achieve a specific texture, the outer contour is hardened and the bore is drilled on a lathe. It is impossible with such forged steel cams to provide ledge- or spring-like projections as can be achieved with sintered cams, without significant effort. In a steel cam, the bore must be remachined with a cutting tool bit in order to create such projections, for instance it would have to be broached. Such a manufacturing step is impractical because of costs. For such a machining process the costs would be considerably increased compared to those which would have to be necessarily expended for a forged cam.

On the other hand, applicant is aware that a camshaft with sintered cams and the previously described construction can be manufactured economically, so that the aim exists to strive for a comparable manufacturing method also for camshafts with forged steel cams. However, cost considerations, as stated above, stand counter to this desire.

SUMMARY OF THE INVENTION

Proceeding from this known state of the art, it is an object of the present invention to provide a camshaft which overcomes the above-mentioned problems in the prior art. Pursuant to this object, and others which will become apparent hereafter, one aspect of the present invention resides in a cone-shaped or forged cam having a passage through it that is widened in a funnel-like manner at least at one end of the passage and at least across a portion of the axial length for receiving the shaft. The opening of the funnel-like widened portion is dimensioned to correspond approximately to the radial height of the beads or webs.

Thanks to this inventive measure the method known for camshafts with sintered cams can be used with forged cams, wherein here primarily a frictional locking takes the place of the positive lock between shaft and cam. By the funnel-like widening of the penetration in the forged cam, an entry zone for the beads or webs is created, into which the beads or webs are pressed with permanent deformation so that a frictional lock with extraordinary retentive power is created between these beads or webs and the internal side of the forged cam. If, in this connection, the statement is made, the dimensioning of the mouth opening of the funnel-like widening corresponds "approximately" to the radial height of the beads or webs, this is understood to mean that this dimension must be equal to larger or a slight amount smaller than the mentioned heights. The funnel-like widening can be formed or bounded by a cone-shaped surface or also by planar surfaces which in their entirety form a truncated pyramid.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is an oblique view of a camshaft with forged cams;

FIG. 2 is a front view of a forged cam;

FIG. 3 is a longitudinal section through the cam in FIG. 2;

FIG. 4 shows a segment of the shaft with webs or beads formed by material displacement;

FIG. 5 shows another embodiment of the shaft;

FIG. 6 shows the push-on process with a forged cam; and

FIG. 7 shows the pushed-on cam in a functionally correct position.

DETAILED DESCRIPTION OF THE PREFERRED EMBODIMENTS

The camshaft shown in FIG. 1 consists of a tubular shaft 1 and pushed or slid-on forged cams 2 immobilized by frictional locking. The cams are arranged upon the tubular shaft 1 so as to be angularly offset relative to each other. It is also possible to use a shaft with a solid cross-section instead of a tubular shaft. Such a shaft is hot forged and FIGS. 2 and 3 illustrate the cams prepared for installation upon the tubular shaft 1. The external contour 3 of the cam 2 is defined by the specifications of the respective area of utilization. The opening 4 for receiving the tubular shaft 1 has in this case a continuously extending wall across its entire circumference, wherein the diameter d of this opening 4 is larger by a small amount than the outer diameter D of the tubular shaft. By a continuous extent of the wall of the opening 4, one means a contour at which only one tangent can be laid at any random point. In the shown embodiment, the cross-section of the opening 4 is circularly-shaped. The opening 4 transits into a funnel-like widening 6 at least on one end face 5 of the cam 2, wherein the angle of opening of this funnel-like widening 6 amounts to approximately 20°. The length of this funnel-like widening 6 amounts to only a fraction of the axial length of the opening 4, for instance the ratio of these lengths amounts to approximately 5:1.

FIG. 4 illustrates that segment of the tubular shaft 1 upon which the forged cam is to be arranged according to FIGS. 2 and 3. Several beads or webs 7 are created by material displacement in this region C by means of rolling tools, as they are also used for the manufacture of rolled threads. The diameter D of the tubular shaft 1 is somewhat smaller than the internal diameter d of the opening 4, and the external diameter D' of the beads or webs 7 is slightly smaller than the diameter d' of the mouth opening of the funnel-like widening 6. The diameter D' of the widened region C of the tubular shaft 1 is essentially constant across its axial length in the embodiment shown in FIG. 4. In the embodiment shown in FIG. 5, the diameter of the beads or webs 7 increases in the displacement direction (arrow 8) of the cam. With such a design of the widened region, where the radial heights of the beads or webs increase wedge—or cone-shaped in the slide-on direction (arrow 8), the opening 4 in the cam 2 is preferably also designed to be cone-shaped along its length, wherein in this case also a funnel-like widened entry zone 6 will be provided.

FIG. 6 shows the instance when the forged cam 2 has with its funnel-like mouth opening reached the first bead or web 7 in the displacement direction 8 during the course of sliding the cam 2 upon the tubular shaft 1, thus during assembly of the camshaft. The beads or webs 7 are now deformed by the funnel-like widened entry zone 6, and indeed they are pressed or squeezed in the outer region as it were into the opening 4, as this can be seen in FIG. 7, which shows the cam completely slid upon the region C. The cam 2 sits upon the tubular shaft 1 and is retained there exclusively by frictional locking, whereby because of the high deformation forces effective here a secure and solid retention of the cam is assured, in spite of the circumstance that only a slight fraction of the material constituting the tubular shaft 1 has been deformed.

In the embodiment shown, the opening 4, which has a continuous extent across its entire circumference, is configured as a cylindrical bore. It lies within the framework of the invention to shape this opening 4 to be approximately oval, thus to give a contour to this opening which deviates from the circular shape, wherein the long axis of this oval lies expediently in the plane of symmetry 9 of the cam, while the short axis of the oval stands perpendicularly thereto. In this case, the dimensions of the parts coming into effective connection with each other are selected so that the smallest diameter of this oval opening is slightly larger than the diameter of the segments located between the widened zones of the shaft, and the largest diameter of the oval opening is smaller than the radial height of the beads or webs. During the sliding-on process of such a cam, the external zones and edges of the beads or webs are deformed precisely in the same way as has been previously described. Over and above this a positive lock is additionally achieved by this shaping. If the opening 4 in the cam 2 has a shape deviating from the circular shape, possibly an oval, then these geometric shape arrangements can in a corresponding way also be transferred to the tubular shaft or the solid shaft.

Such oval openings can be fabricated on modern program-controlled machine tools without any particular difficulty and without incurring additional costs. It is also possible on such machine tools to shape a multicornered opening, so that its cross-section has the shape of a polygon, preferably of a regular polygon. It is possible to approach approximately a circular or oval shape by providing a large quantity of polygon sides. At least theoretically such polygons are discontinuous since several tangents can be applied to the corner in which consecutive straight sides intersect. The funnel-shaped widening of the mouth aperture can in spite of this be formed by a cone-shaped surface. It lies however also within the framework of the invention, to provide here planar surfaces, whose quantity corresponds to the quantity of the sides of the polygon.

In the described and discussed embodiment the beads and webs obtained by material displacement extend in the circumferential direction of the shaft. It is also possible to shape the camshaft in such a way that the beads or webs obtained by material displacement extend essentially parallel to the axis of the camshaft.

It is possible, thanks to the present invention, to manufacture composite camshafts with forged cams.

When forging is previously mentioned in the specification, and also in the claims, in connection with the cams, then a pressure deformation of the material on the workpiece with shaping tools moving against each other (in the sense of standard in DIN 8583, R1.4) is meant by this general concept.

While the invention has been illustrated and described as embodied in a cam shaft for controlling valves in lateral combustion engines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A cam shaft for controlling valves in internal combustion engines, said cam shaft comprising:
a shaft having a first diameter, and a predetermined axial region having a second diameter, which is greater than the first diameter, wherein the second diameter is defined by a plurality of beads, which are provided at least on a portion of a circumference of said shaft in said predetermined axial region thereof and which have a predetermined radial height determined by a height of a radial projection of said beads beyond the first diameter; and
at least one forged cam fixedly secured on said shaft in said predetermined axial region thereof and having a through-opening for receiving said shaft, wherein said through-opening has, at one end thereof, a widening cone-shaped portion defining a mouth of said through-opening and having an outer dimension which substantially corresponds to the radial height of said beads in a non-assembled condition of said shaft, wherein a ratio of an axial length of said cone-shaped portion to axial length of said through-opening is approximately 1:5, and wherein said cone-shaped portion has an opening angle of approximately 20°.

2. The camshaft of claim 1, wherein the radial height of said beads increases in a cone-like manner along the axial length of said shaft from a sliding-on side of said cam, and wherein said outer dimension corresponds to an average radial height of said beads.

3. The camshaft of claim 1, wherein said beads extend along an axis of said shaft.

4. The camshaft of claim 1, wherein said beads extend in a circumferential direction of said shaft.

5. The camshaft of claim 1, wherein said beads are formed by material displacement.

* * * * *